United States Patent
Koyama et al.

(10) Patent No.: US 7,958,378 B2
(45) Date of Patent: Jun. 7, 2011

(54) POWER SUPPLY DEVICE HAVING LOAD DETECTION FUNCTION AND COMMUNICATION APPARATUS PROVIDED WITH THE POWER SUPPLY DEVICE

(75) Inventors: Yoshito Koyama, Kawasaki (JP); Seiji Miyoshi, Kawasaki (JP); Eiji Miyachika, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 666 days.

(21) Appl. No.: 11/987,578

(22) Filed: Nov. 30, 2007

(65) Prior Publication Data

US 2008/0184048 A1     Jul. 31, 2008

(30) Foreign Application Priority Data

Jan. 26, 2007   (JP) ................................. 2007-016995

(51) Int. Cl.
G06F 1/26           (2006.01)
(52) U.S. Cl. ....................................................... 713/300
(58) Field of Classification Search .................. 713/300, 713/320, 323, 324, 340
See application file for complete search history.

(56) References Cited

U.S. PATENT DOCUMENTS

| | | | |
|---|---|---|---|
| 6,580,901 B1 | 6/2003 | Mochizuki | |
| 6,683,494 B2 | 1/2004 | Stanley | |
| 6,785,829 B1 * | 8/2004 | George et al. | 713/320 |
| 7,142,009 B1 * | 11/2006 | Watt et al. | 326/38 |
| RE40,473 E * | 8/2008 | Osborn et al. | 713/300 |
| 2002/0079951 A1 | 6/2002 | Borkar et al. | |
| 2002/0167354 A1 | 11/2002 | Stanley | |
| 2004/0028242 A1 | 2/2004 | Kitamura | |
| 2004/0061380 A1 | 4/2004 | Hann et al. | |
| 2004/0123170 A1 | 6/2004 | Tschanz et al. | |
| 2006/0280112 A1 | 12/2006 | Fujii | |

FOREIGN PATENT DOCUMENTS

| | | |
|---|---|---|
| EP | 0 663 634 | 7/1995 |
| EP | 1014570 A2 * | 6/2000 |
| JP | H08-223928 A * | 8/1996 |
| JP | H09-154275 A * | 6/1997 |
| JP | 2000-023355 A * | 1/2000 |
| JP | 2000-183763 A * | 6/2000 |
| JP | 2002-223132 A * | 8/2002 |
| JP | 2005-509306 T * | 4/2005 |
| JP | 2005-130616 A * | 5/2005 |
| JP | 2006-500897 T * | 1/2006 |
| KR | 20-147523 | 6/1999 |

OTHER PUBLICATIONS

Extended European Search Report issued in corresponding European Patent Application No. 07121891.1 on Mar. 20, 2008.
Korean Office Action dated Oct. 26, 2009 issued in corresponding Korean Patent Application 10-2007-0131039.

* cited by examiner

Primary Examiner — Glenn A Auve
(74) Attorney, Agent, or Firm — Fujitsu Patent Center

(57) ABSTRACT

A power supply device of the invention includes: a supply section that supplies power to a second processing device which processes data in response to processing execution by a first processing device which processes data; a load detection section that detects a load of processing execution by the first processing device; and a power control section that causes the supply section to increase or decrease power supply according to the magnitude of load detected by the load detection section. The load of processing execution by the first processing device disposed in the upstream side relative to the second processing device is detected, and power supply to the second processing device is increased or decreased according to the detected magnitude of load. Accordingly, even when the amount of processing data sharply increases, sufficient power can be unfailingly supplied to the second processing device.

5 Claims, 10 Drawing Sheets

POWER SUPPLY DEVICE HAVING LOAD DETECTION FUNCTION AND COMMUNICATION APPARATUS PROVIDED WITH THE POWER SUPPLY DEVICE

BACKGROUND OF THE INVENTION

1. Field of the Invention

The present invention relates to a power supply device that supplies electric power to a processing device, and a communication apparatus that performs a communication processing.

2. Description of the Related Art

In conventional art, electric apparatuses such as a communication apparatus or server apparatus are each provided with a power supply device that supplies electric power to ICs and the like that execute various types of processings; and electric power must be stably supplied to this power supply device at all times. Particularly, voltages outputted to the ICs and the like need to be regulated at a constant level.

FIG. 1 is a schematic configuration diagram of a power supply device that supplies electric power to an electric apparatus.

The power supply device 10 illustrated in FIG. 1 is an analog control type power supply device using analog elements such as an amplifier and a comparator, which regulates the voltage outputted to ICs and the like.

The power supply device 10 includes a voltage detection circuit 11, error amplifier 12, compensation circuit 13, reference oscillator 14, comparator 15, switching element 16 and smoothing filter 17.

First, the voltage detection circuit 11 detects power source output voltage Vout currently outputted from the power supply device 10 to ICs and the like. The detected output voltage Vout is sent to the error amplifier 12. The error amplifier 12 amplifies and outputs a difference between output voltage Vout and reference voltage V0. The compensation circuit 13 regulates amplification voltage Vg outputted from the error amplifier 12 at a value suitable for the sensitivity of the comparator 15.

The reference oscillator 14 outputs voltage signal Vp of a sawtooth waveform at a given frequency. The comparator 15 compares voltage signal Vp of a sawtooth waveform outputted from the reference oscillator 14 with amplification voltage Vg regulated by the compensation circuit 13, and sends a control signal to the switching element 16, wherein the control signal turns on when voltage signal Vp of a sawtooth waveform is smaller than amplification voltage Vg, and turns off otherwise.

ON/OFF control of the switching element 16 is performed by use of the control signal sent from the comparator 15, so that the pulse width of input voltage Vin inputted to the power supply device 10 is regulated; and the smoothing filter 17 executes a smoothing processing. Consequently, output voltage Vout having a regulated voltage value is outputted from the power supply device 10 to the electric apparatus. For example, when output voltage Vout detected by the voltage detection circuit 11 lowers, the difference calculated by the error amplifier 12 between output voltage Vout and reference voltage V0 increases. As a result, voltage signal Vp of a sawtooth waveform becomes smaller than amplification voltage Vg and thus "ON" time of the control signal outputted from the comparator 15 lengthens to increase the pulse width of input voltage Vin. Thus, output voltage Vout rises.

As described above, control is performed in the power supply device 10 so that the output voltage outputted to the processing section is kept constant.

In recent years, as power saving of electric apparatuses and miniaturization of batteries progress, there is increasing demand for lower-voltage application of various components and ICs etc. constituting an electric apparatus. Thus, the current flowing into these components and ICs tends to increase. Further, in the communication apparatuses, server apparatuses and the like, the current flowing into an IC which executes a communication processing can sharply increase in such a manner that interlocks with the traffic state of communication; in this case, the originally low voltage applied to the IC may further lower and fall below a minimum voltage allowing execution of the communication processing, thus causing a trouble such as signal interruption.

In this regard, Japanese Patent Laid-Open No. 9-154275 has disclosed a technique of providing a power supply device with a capacitor for soft start and thereby reducing a sharp change in current at the time of turning on or turning off the power supply. When current is varied smoothly at the time of turning on or turning off the power supply, the internal circuit can be prevented from being overloaded by a peak current during start-up of the power supply, or from malfunctioning due to voltage reduction; these are now posing a problem for electric apparatuses for which large-current application has progressed.

However, the technique described in Japanese Patent Laid-Open No. 9-154275 cannot cope with a sharp change in current caused by an increase in load in a processing intermittently performed, such as a communication processing.

In the conventional analog control type power supply devices, the switching frequency is raised to improve the response of power supply; power supply is regulated in a manner following a sharp change in processing load. However, with only this regulation of switching frequency, it is difficult to further improve the response of power supply.

SUMMARY OF THE INVENTION

The present invention has been made in view of the above circumstances and provides a power supply device and communication apparatus in which power can be stably supplied irrespective of processing load.

The power supply device according to the present invention includes:

a supply section that supplies power to a second processing device which processes data in response to processing execution by a first processing device which processes data;

a load detection section that detects a load of processing execution by the first processing device; and a power control section that causes the supply section to increase or decrease power supply according to the magnitude of load detected by the load detection section.

According to the power supply device of the present invention, the load of processing execution by the first processing device disposed in the upstream side relative to the second processing device is detected, and power supply to the second processing device is increased or decreased according to the detected magnitude of load. Accordingly, even when the amount of processing data sharply increases, sufficient power can be unfailingly supplied to the second processing device.

In the power supply device of the present invention, it is preferable that: in the supply section, voltage is variable in supplying power; and the power control section causes the supply section to increase or decrease power supply by raising or lowering the voltage of the supply section.

When the voltage applied to the second processing device lowers, there is a risk that the processing cannot be executed, or a large current flows in the second processing device and thus a malfunction occurs due to heating or overload. When power supply is increased or decreased by raising or lowering of voltage, the processing can be stably executed in the second processing device.

In the power supply device of the present invention, it is preferable that the first processing device and the second processing device are incorporated in a communication apparatus and serve to apply a communication processing to data communicated by the communication apparatus.

In the communication apparatus, the load of processing execution largely increases or decreases according to the amount of transmitted/received data, so the power supply device of the present invention can be appropriately used.

The communication apparatus according to another aspect of the invention includes:

a first processing section that serves to apply a first communication processing to data;

a second processing section that serves to apply a second communication processing to data in response to processing execution by the first processing section;

a supply section that supplies power to the second processing section;

a load detection section that detects a load of processing execution by the first processing section; and a power control section that causes the supply section to increase or decrease power supply according to the magnitude of load detected by the load detection section.

According to the communication apparatus of this aspect of the invention, even when communication data sharply increases, reliable communication processing execution is possible.

In the communication apparatus of this aspect of the invention, it is preferable that: in the supply section, voltage is variable in supplying power; and the power control section causes the supply section to increase or decrease power supply by raising or lowering the voltage of the supply section.

Since power supply is increased or decreased by raising or lowering of voltage, processing stability can be improved.

As described in the above, according to the present invention, power can be stably supplied to the processing device irrespective of processing load, and thus reliable processing execution is possible.

DETAILED DESCRIPTION OF THE INVENTION

An embodiment of the present invention will be described below.

Figure 1:
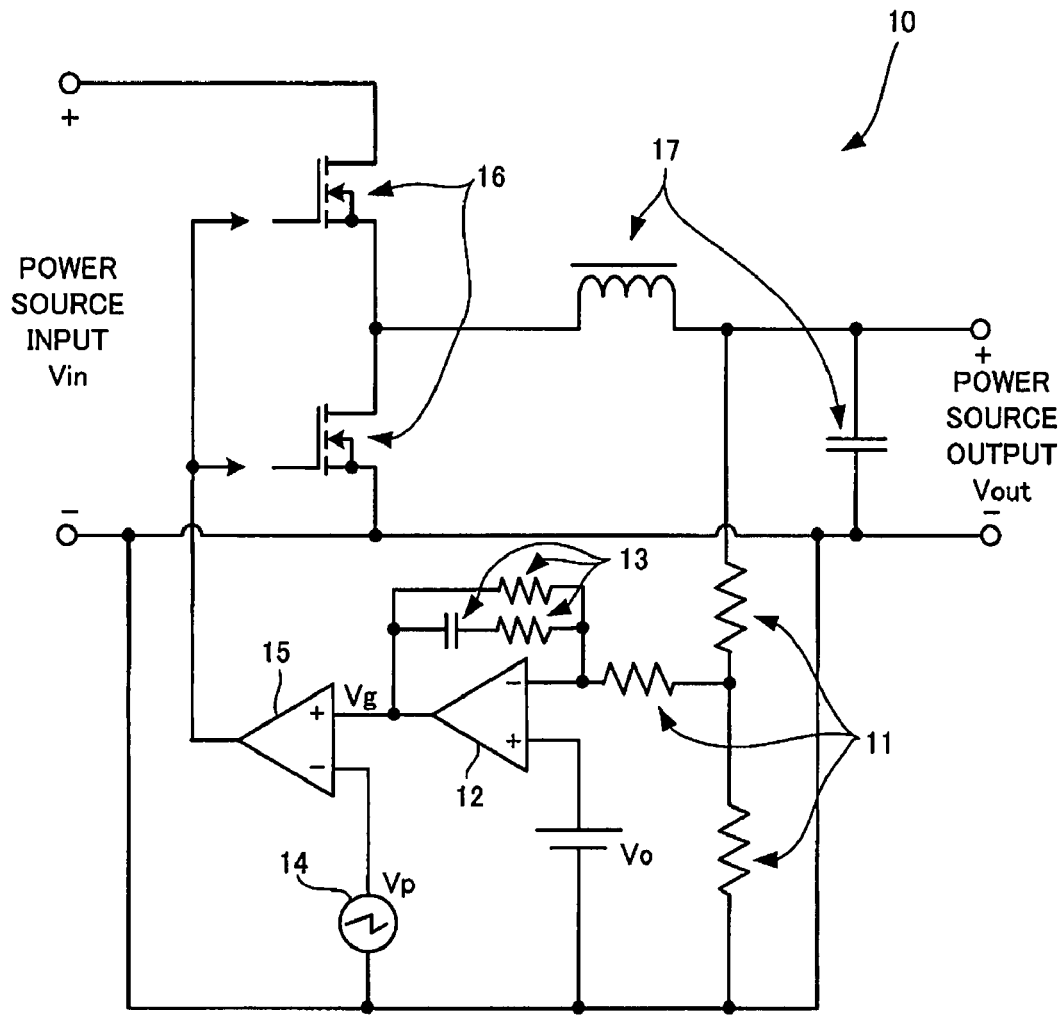
FIG. 1 is a schematic configuration diagram of a power supply device that supplies electric power to an electric apparatus.
Figure 2:
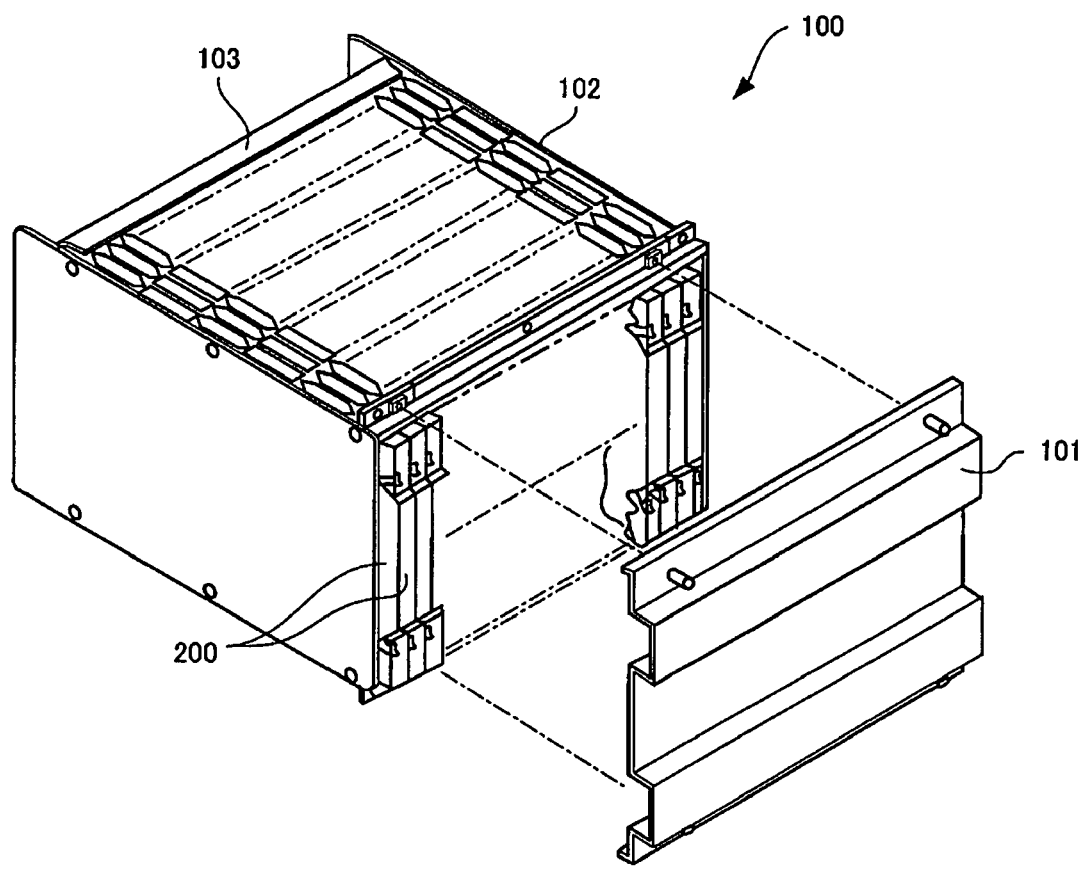
FIG. 2 is an external perspective view of a communication unit to which an embodiment of the present invention is applied.

FIG. 2 is an external perspective view of a communication unit to which an embodiment of the present invention is applied.

This communication unit 100 serves to transmit/receive data via a network, and includes a unit cover 101, a unit frame 102, a back panel 103, and plural electrical circuit packages 200 contained in a space surrounded by these parts, which each execute a processing.

In the interior side of the back panel 103, there are arranged various types of connectors (not illustrated) for transmitting data and electric power. These connectors are fit in connectors arranged in each of the plural electrical circuit packages 200, so that the plural electrical circuit packages 200 are connected to each other.

The plural electrical circuit packages 200 serve to apply a processing, one after the other, on communication data received via a network; in response to processing execution by the former-stage electrical circuit package 200, processing execution in the latter-stage electrical circuit package 200 starts. The electrical circuit packages 200 each include a substrate 220 (refer to FIG. 4) having mounted thereon ICs and the like, and a holding board 210 (refer to FIG. 3) that holds the substrate 220.

Figure 3:
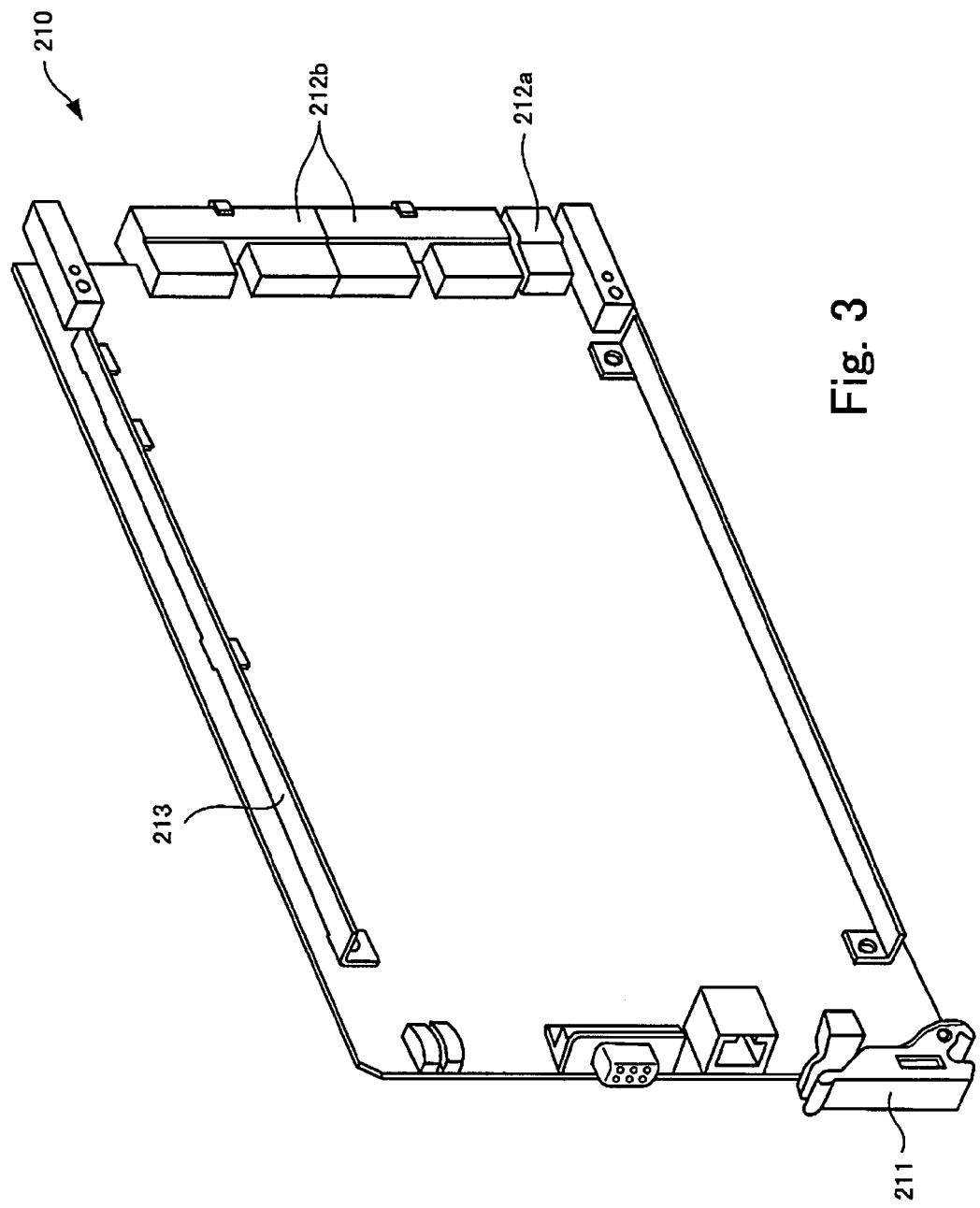
FIG. 3 is a perspective view of a holding board.
Figure 4:
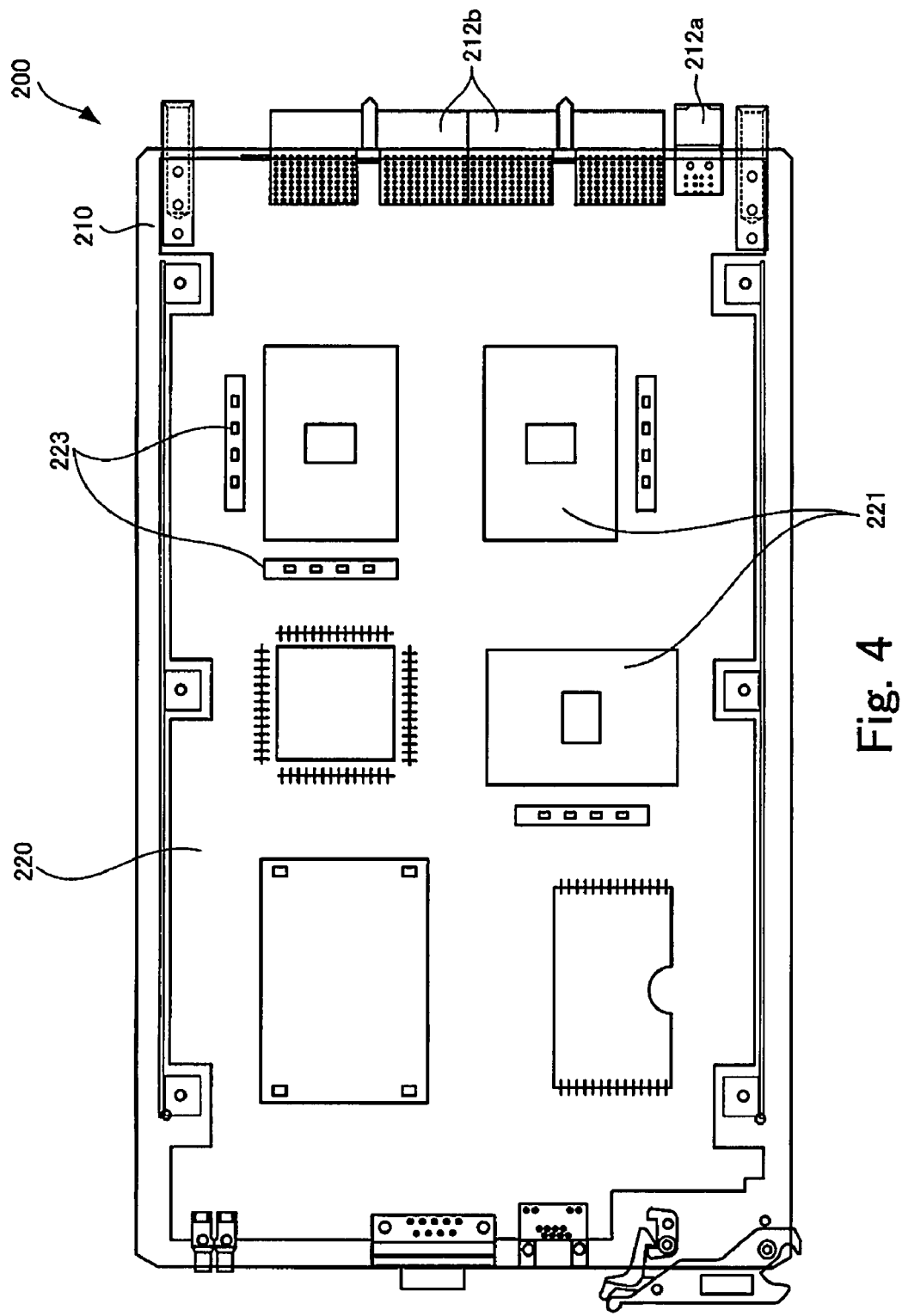
FIG. 4 is a schematic view of an electrical circuit package.

FIG. 3 is a perspective view of the holding board 210 constituting the electrical circuit package 200. FIG. 4 is a schematic view of the electrical circuit package 200 having the substrate 220 mounted on the holding board 210.

The holding board 210 includes: a grasping section 211 for grasping the holding board 210 by a hand in inserting and removing the holding board 210 from the unit frame 102 of FIG. 2; a power source connector 212a for supplying power to the electrical circuit package 200; a warpage prevention matallic member 213 for preventing warpage of the substrate 220; and a data connector 212b for transmitting and receiving various types of data.

FIG. 4 illustrates the electrical circuit package 200 having the substrate 220 mounted in the holding board 210. Arranged in the substrate 220 are plural processing circuits 221 such as an IC, a power supply source 223 for supplying power to the plural processing circuits 221, and the like. When the substrate 220 is fit in the holding board 210, so that the power source connector 212a and data connector 212b of the holding board 210 are inserted in the substrate 220, the substrate 220 is mounted on the holding board 210. Further, when the holding board 210 is fit in the unit frame 102 illustrated in FIG. 2 and is connected to the connectors of the back panel 103, the plural electrical circuit packages 200 are connected to each other.

Figure 5:
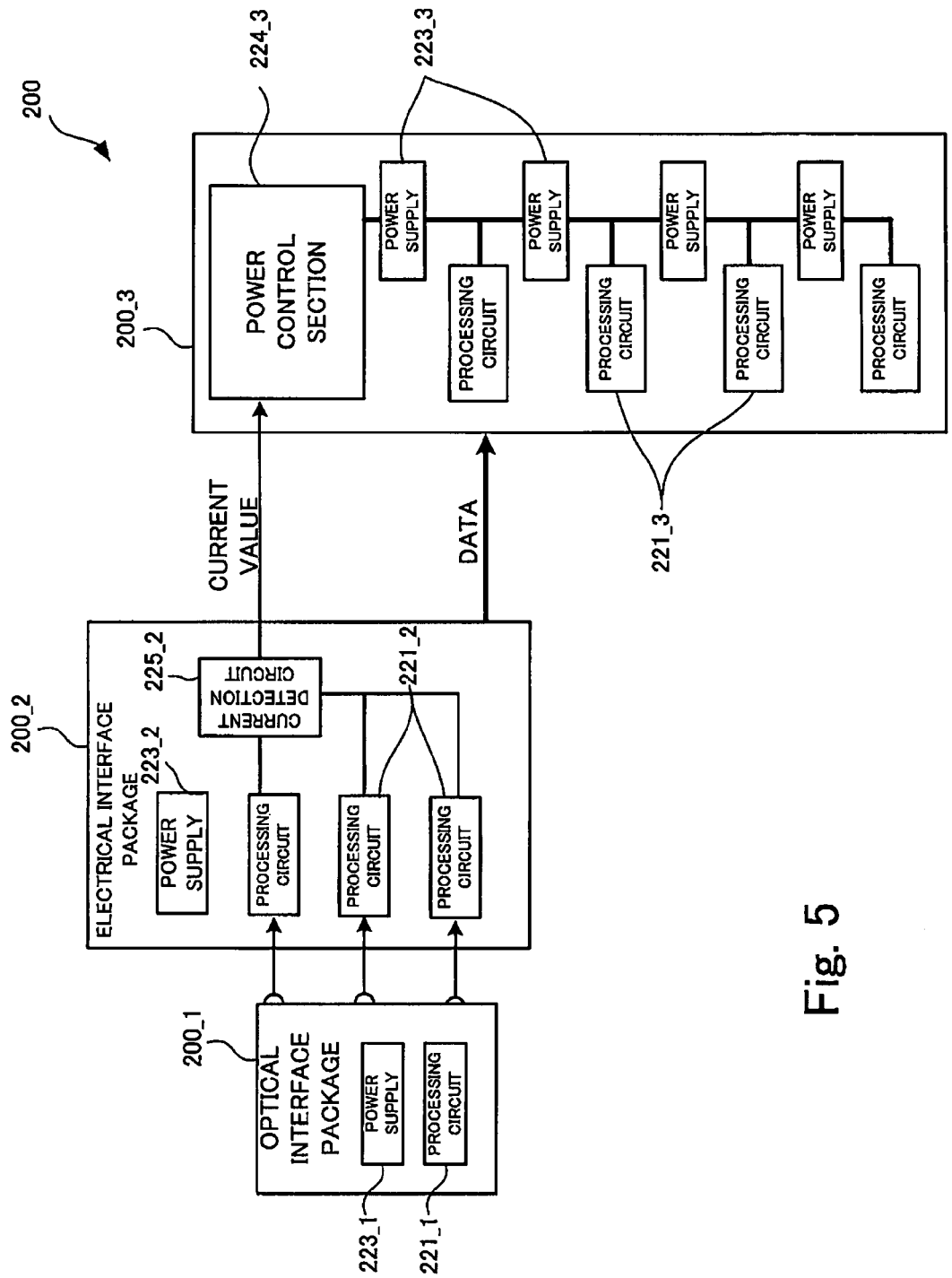
FIG. 5 is a schematic functional block diagram of three electrical circuit packages of the plural electrical circuit packages illustrated in FIG. 2.

FIG. 5 is a schematic functional block diagram of three electrical circuit packages 200_1, 200_2 and 200_3 of the plural electrical circuit packages 200 illustrated in FIG. 2.

Respective elements constituting each of the three electrical circuit packages 200_1, 200_2 and 200_3 will be described below while making a distinction between them by use of suffix numerals.

FIG. 5 illustrates an optical interface package 200_1 that receives optical data transmitted via a network; an electrical interface package 200_2 that converts the optical data received by the optical interface package 200_1 into digital data; and a signal processing package 200_3 that applies various types of signal processings to the digital data obtained by the conversion by the electrical interface package 200_2. According to the present embodiment, firstly power is supplied to the whole communication unit 100 illustrated in FIG. 2, and then that power is distributed to the respective power supply sources 223 of the plural electrical circuit packages 200, and thereafter the power is supplied from the power supply source 223 to the processing circuit 221 in each of the electrical circuit package 200.

The electrical interface package 200_2 includes a current detection circuit 225_2 that detects a current value flowing into the processing circuit 221_2 during processing execution. The signal processing package 200_3 includes a power control section 224_3 that acquires the current value detected by the current detection circuit 225_2 of the electrical interface package 200_2 and regulates power supply by the power supply source 223_3 according to the acquired current value. The processing circuit 221_2 of the electrical interface package 200_2 corresponds to an example of the first processing device and the first processing section according to the present invention; the processing circuit 221_3 of the signal processing package 200_3 corresponds to an example of the second processing device and the second processing section according to the present invention; the current detection circuit $225_{13}2$ of the electrical interface package 200_2 corresponds to an example of the load detection section according to the present invention; the power supply source 223_3 of the signal processing package 200_3 corresponds to an example of the supply section according to the present invention; and the power control section 224_3 corresponds to an example of the power control section according to the present invention.

Figure 6:
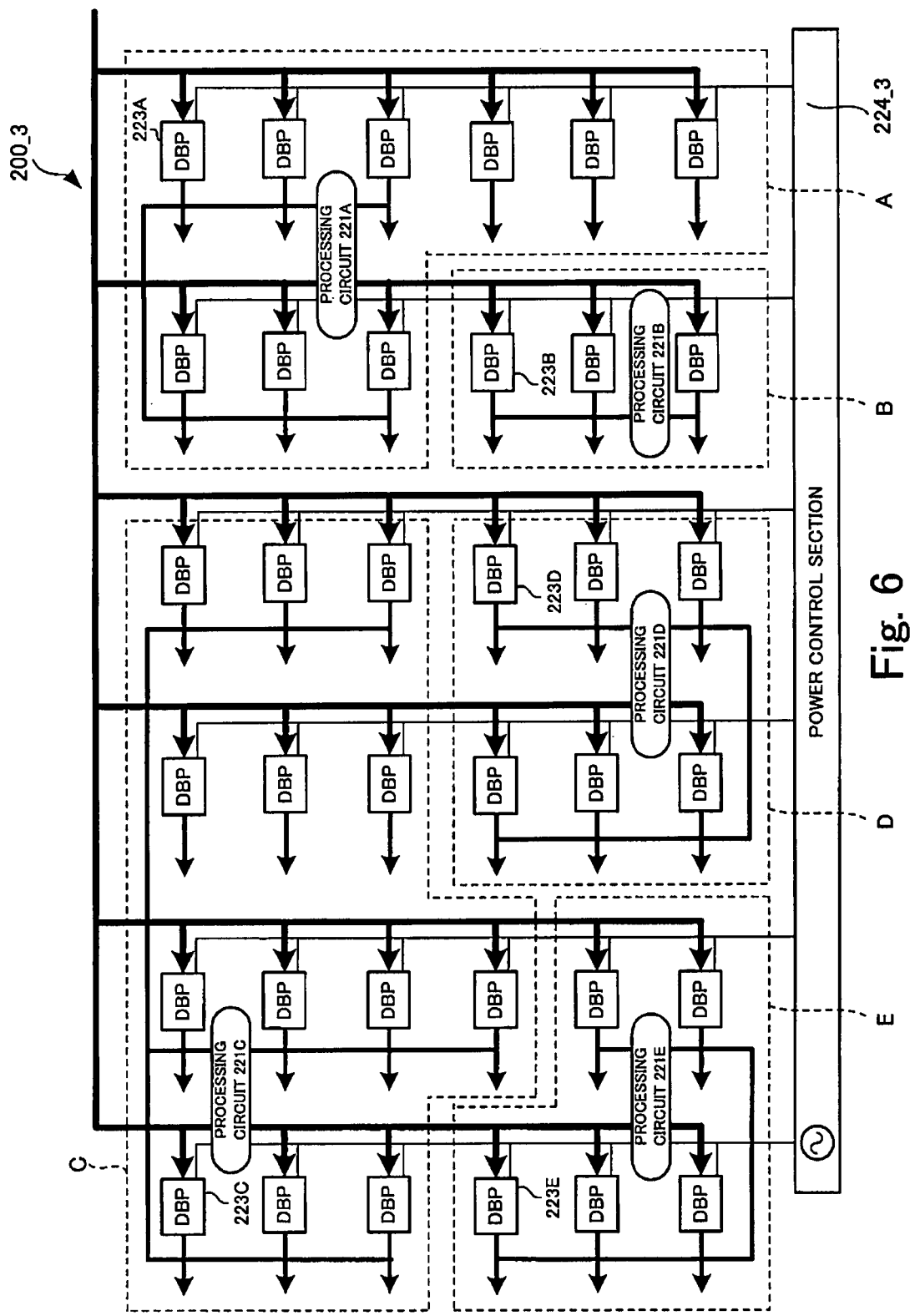
FIG. 6 is a schematic configuration diagram of a power supply source, a power control circuit, and a processing circuit in a signal processing package.

FIG. 6 is a view for explaining a flow of power supply in the signal processing package 200_3.

The signal processing package 200_3 includes, as illustrated in FIG. 6, plural processing circuits 221A, 221B, 221C, 221D and 221E. Plural power supply sources 223A, 223B, 223C, 223D, and 223E are connected to the processing circuits 221A, 221B, 221C, 221D and 221E, respectively, thus forming plural power groups A, B, C, D and E. Referring to FIG. 6, the same suffix alphabetical characters common in the reference characters designate identical power groups.

At the time of turning on the power supply or on other occasions, when power is supplied all at once to the plural processing circuits 221A, 221B, 221C, 221D and 221E, so that these processing circuits 221A, 221B, 221C, 221D and 221E are simultaneously turned on, the voltages applied to each of the processing circuits 221A, 221B, 221C, 221D and 221E may rapidly lower, so that the voltage needed to turn on the circuits is not supplied, or a large current may flow into the processing circuits 221A, 221B, 221C, 221D and 221E to cause them to fail. In the signal processing package 200_3 according to the present embodiment, the power control section 224_3 regulates the timings of turning on the processing circuits 221A, 221B, 221C, 221D and 221E.

Firstly, when the power supply to the communication unit 100 illustrated in FIG. 2 is turned on, the power is distributed to each of the electrical circuit packages 200. In the signal processing package 200_3 illustrated in FIG. 6, firstly the power control section 224_3 gives a power supply command to the power supply source 223A belonging to the power group A, and the power supply source 223A supplies power to the processing circuit 221A of the power group A. As a result, the processing circuit 221A is turned on.

Similarly, the processing circuit 221B belonging to the power group B, the processing circuit 221C belonging to the power group C, the processing circuit 221D belonging to the power group D, and the processing circuit 221E belonging to the power group E are turned on one after the other.

In this way, since power is supplied, in such a manner that is shifted in time, to the plural processing circuits 221A, 221B, 221C, 221D and 221E, so that the processing circuits 221A, 221B, 221C, 221D and 221E are each turned on at a different timing, the trouble caused by a sharp increase in processing load can be reduced.

Further, when the plural power supply sources are, as illustrated in FIG. 6, arranged around one processing circuit, the distance between the processing circuit and power supply source is shortened, allowing more efficient power supply. In addition, since the plural power supply sources are used, the power scale of each power supply source can be reduced, allowing downsizing of coils and capacitors for smoothing the power supplied from the power supply source.

In communication apparatuses, the amount of processed data usually increases or decreases intermittently. Thus, not only at the time of turning on the communication apparatus but also when the amount of communication data sharply increases, a large current may flow into the processing circuit to cause a large voltage drop, so that the processing cannot be executed.

In the communication unit 100 according to the present embodiment, the load of processing executed by each of the processing circuits 221A, 221B, 221C, 221D and 221E is preliminarily predicted, and according to this load, the power supplied to each of the processing circuits 221A, 221B, 221C, 221D and 221E is regulated. The method of regulating power supply will be described in detail below.

Of the five processing circuits 221A, 221B, 221C, 221D and 221E constituting the signal processing package 200_3 illustrated in FIG. 6, the four processing circuits 221B, 221C, 221D and 221E serve to apply various types of signal processing to communication data sent from the former-stage electrical interface package 200_2; and as the amount of communication data increases, the load of processing executed by each of the processing circuits 221B, 221C, 221D and 221E also increases. The remaining processing circuit 221A serves to apply a virus check to the communication data sent from the former-stage electrical interface package 200_2; and the load of processing varies depending on whether or not the communication data has an accompanying file attached thereto, rather than the amount of communication data.

Firstly, there will be described the method of regulating power supply to the four processing circuits 221B, 221C, 221D and 221E in which the load of processing depends significantly on the amount of communication data.

Here, the processing circuit 221B provided with three power supply sources 223B will be described as representative of the four processing circuits 221B, 221C, 221D and 221E.

Figure 7:
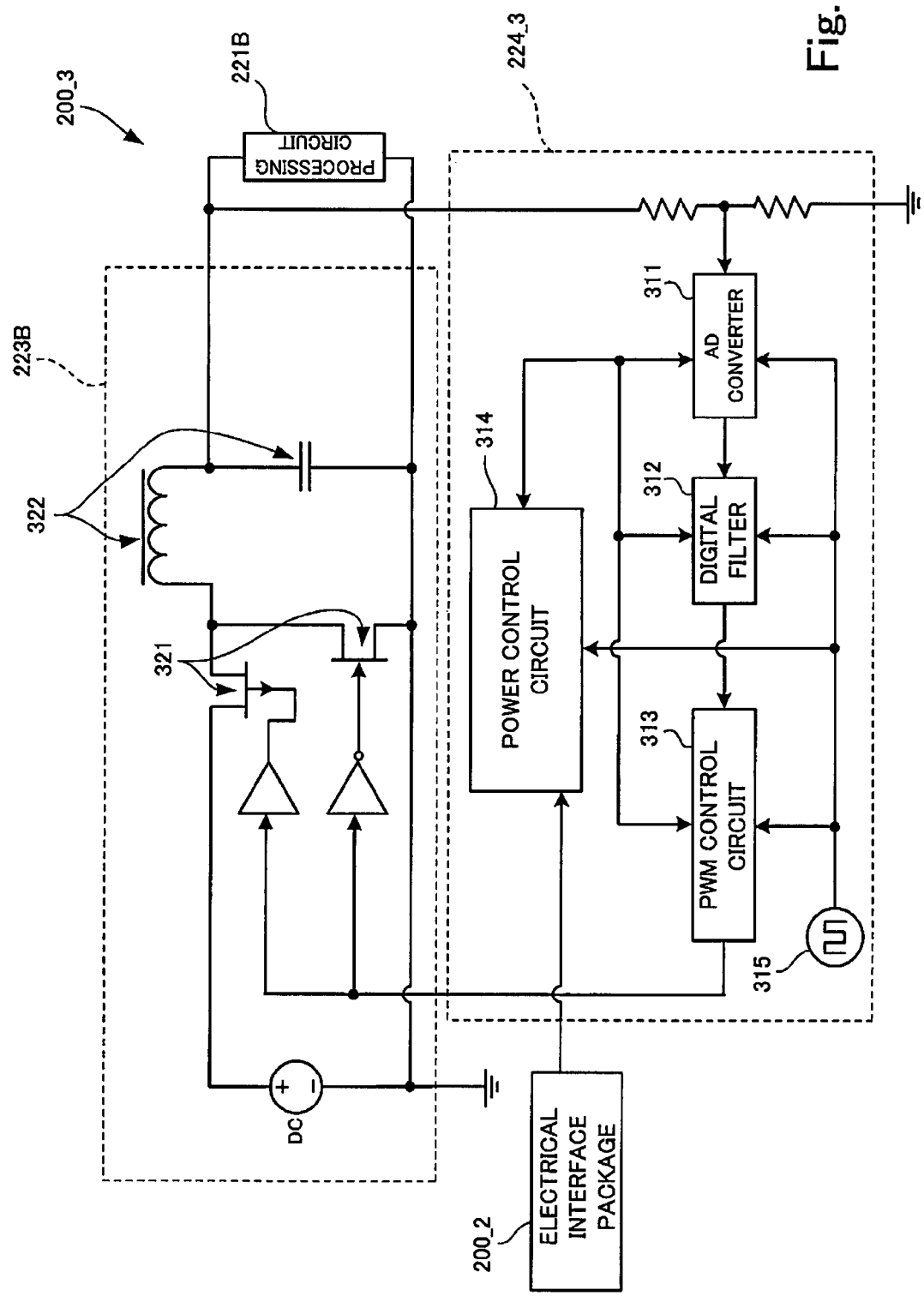
FIG. 7 is a schematic configuration diagram of the power supply source, power control circuit, and processing circuit of the signal processing package illustrated in FIG. 6.

FIG. 7 is a schematic configuration diagram of the processing circuit 221B, the power supply source 223B for supplying power to the processing circuit 221B, and the power control section 224_3.

It is noted that, while the processing circuit 221B is actually provided with the three power supply sources 223B, only one power supply source 223B is illustrated in FIG. 7 in order to simplify the explanation.

The power control section 224_3 includes, as illustrated in FIG. 7, an AD (analog-digital) converter 311, a digital filter 312, PWM control circuit 313, a power control circuit 314, and a pulse oscillator 315; and the power supply source 223B includes a switch element 321 and a smoothing filter 322.

In regulating power supply to the processing circuit 221B, as with the conventional analog power supply devices, there is basically used a feedback processing of regulating power to be supplied at a time after the present time based on power supplied at a time before the present time.

Firstly the AD converter 311 detects a voltage applied at a time before the present time by the power supply source 223B to the processing circuit 221B, converts the detected voltage into a digital signal, and sends the digital signal to the digital filter 312. The digital filter 312 calculates a difference between the detected voltage and a preset reference voltage, and averages the difference to produce an error signal. The produced error signal is sent to the PWM control circuit 313.

The PWM control circuit 313 produces, based on a pulse signal generated by the pulse oscillator 315 and the error signal sent from the digital filter 312, a control signal of a pulse width dependent on a control value sent from the power control circuit 314, and sends the produced control signal to the switch element 321. Processings performed in the PWM control circuit 313 and power control circuit 314 will be described in detail later.

The switch element 321 performs ON/OFF control according to the control signal sent from the PWM control circuit 313, thus regulating the pulse width of input voltage. Further, a voltage having the regulated pulse width regulated passes through the smoothing filter 322, so that the voltage applied to the processing circuit 221B is smoothed, and power is supplied to the processing circuit 221B. The power supplied to the processing circuit 221B will also be described in detail later.

For example, when the voltage applied to the processing circuit 221B lowers, the value of error signal produced by the digital filter 312 increases, and thus the power control circuit 314 produces a control signal of a wider pulse width. As a result, "ON" time of the switch element 321 lengthens, and thus the voltage applied to the processing circuit 221B rises. As described above, the power supplied to the processing circuit 221B is regulated by the feedback control.

Further, according to the present embodiment, a current value flowing into the processing circuit 221_2 of the former-stage electrical interface package 200_2 is sent from the electrical interface package 200_2 to the power control circuit 314 at every predetermined timing. Typically, as the amount of communication data to be processed increases, the load of processing increases and thus a larger current flows into the processing circuit. Since the value of current flowing into the former-stage electrical interface package 200_2 is sent, the load of processing to be executed in the processing circuit 221B can be predicted.

The power control circuit 314 sends a control signal every time the current value is sent to the electric interface package 200_2. As the value of current acquired from the electrical interface package 200_2 is larger, the power control circuit 314 causes the AD converter 311 to reduce its detection voltage to a larger extent, and causes the digital filter 312 to use a smaller reference voltage, and causes the PWM control circuit 313 to increase the pulse width of control signal. As a result, the voltage applied from the power supply source 223B to the processing circuit 221B rises.

In this way, according to the present embodiment, the power to be supplied at a time after the present time is regulated based on the power supplied at a time before the present time (feedback control) and at the same time, power supply is regulated according to the load of processing executed by the former-stage electrical interface package 200_2 (feedforward control) Consequently, power can be stably supplied to the processing circuit, so that troubles caused by an increase in load in processing execution can be prevented.

In this case, while sufficient power is supplied to the processing circuit 221B, when the voltage to be applied to the processing circuit 221B does not reach the minimum voltage allowing execution of processing, troubles such as flawed communication data may occur. In the communication unit 100 according to the present embodiment, the power supplied to the processing circuit is regulated by raising or lowering of voltage; when the increase in load is predicted, the voltage is preliminarily raised, so reliable processing execution is possible.

Here, when the power control circuit 314 goes out of control, the PWM control circuit 313 is freed from the control by the power control circuit 314, and there is executed a processing for maintaining the voltage applied to the processing circuit at a constant level.

Figure 8:
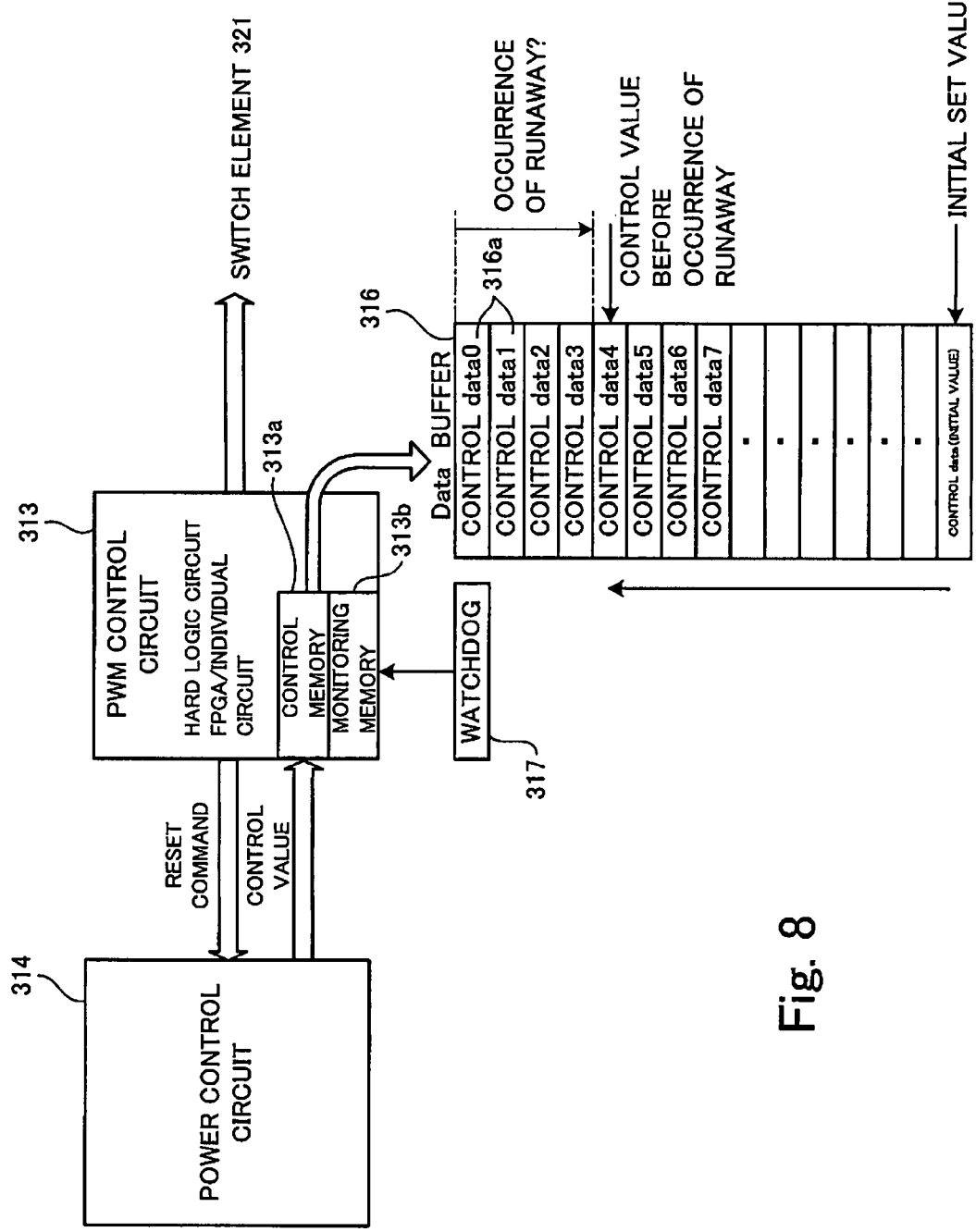
FIG. 8 is a view illustrating a flow of data transmitted between a power control circuit and PWM control circuit.

FIG. 8 is a view illustrating the configuration of the power control circuit 314 and PWM control circuit 313, and a flow of data transmitted between the power control circuit 314 and PWM control circuit 313.

As illustrated in FIG. 8, in the signal processing package 200_3, there are mounted a buffer 316 for storing a control signal (a voltage applied to the processing circuit 221) sent at every predetermined timing from the power control circuit 314 to the PWM control circuit 313, and a watchdog 317 for monitoring operational abnormality of the power control circuit 314.

The buffer 316 is divided into plural storage areas 316a; an initial value is preliminarily stored in the lowest storage area 316a shown in the lowest part of FIG. 8. In the buffer 316, data is stored in each storage area 316a starting from the lowest one; when the uppermost storage area 316a is reached, data is overwritten starting from the data stored in the storage area 316a adjacent to the lowest one. The buffer 316 corresponds to an example of the storage section according to the present invention.

Further, the PWM control circuit 313 is provided with a control memory 313a into which a control signal is written, and a monitoring memory 313b into which an initial value "1" is preliminarily written by a hardware.

In sending a control value (a voltage applied to the processing circuit 221B) to the PWM control circuit 313, the power control circuit 314 writes the control value into the control memory 313a of the PWM control circuit 313 and at the same time writes a value "0" indicating an normal operation into the monitoring memory 313b.

When receiving the control value from the power control circuit 314, the PWM control circuit 313 writes the control value written into the control memory 313a into the buffer 316.

The watchdog 317 monitors a value written into the monitoring memory 313b; when a value other than "0" indicating an normal operation is written into the monitoring memory 313b, the watchdog 317 notifies operational abnormality of the power control circuit 314 to the PWM control circuit 313. When the power control circuit 314 malfunctions, an irregular value is written into the monitoring memory 313b. Since the value of the monitoring memory 313b is monitored by the watchdog 317, abnormality of the power control circuit 314 can be unfailingly detected.

When informed of operational abnormality of the power control circuit 314 by the watchdog 317, the PWM control circuit 313 gives a reset command to the power control circuit 314 and at the same time acquires a control value (a power supplied to the processing circuit 221B and a voltage applied to the processing circuit 221B) written in the buffer 316 at a time before being informed of the operational abnormality and produces a control signal of a pulse width dependent on the acquired control value. The produced control signal is sent to the switch element 321 illustrated in FIG. 6, so the switch element 321 is turned on/off according to the control signal. As a result, a voltage of the same value as one written in the buffer 316 at a time before being informed of the operational abnormality, is applied to the processing circuit 221.

When resetting of the power control circuit 314 is finished and "0" indicating a normal operation is written again into the monitoring memory 313b, the watchdog 317 notifies recovery of the power control circuit 314 to the PWM control circuit 313.

When informed of the recovery of the power control circuit 314, the PWM control circuit 313 produces again a control signal according to a control value sent from the power control circuit 314.

In this way, in the communication unit 100 of the present embodiment, even when the power control circuit 314 itself goes out of control, it is possible to unfailingly prevent an excessive current from flowing into the processing circuit 221, so the processing circuit 221 is not damaged. Thus, the reliability of processing execution in the processing circuit 221 can be improved.

Further, in the communication unit 100 of the present embodiment, power is supplied in a phase shifted manner from plural power supply sources 223 to each of the processing circuits 221, so that the apparent frequency of power supplied to each of the processing circuits 221 is raised.

Figure 9:
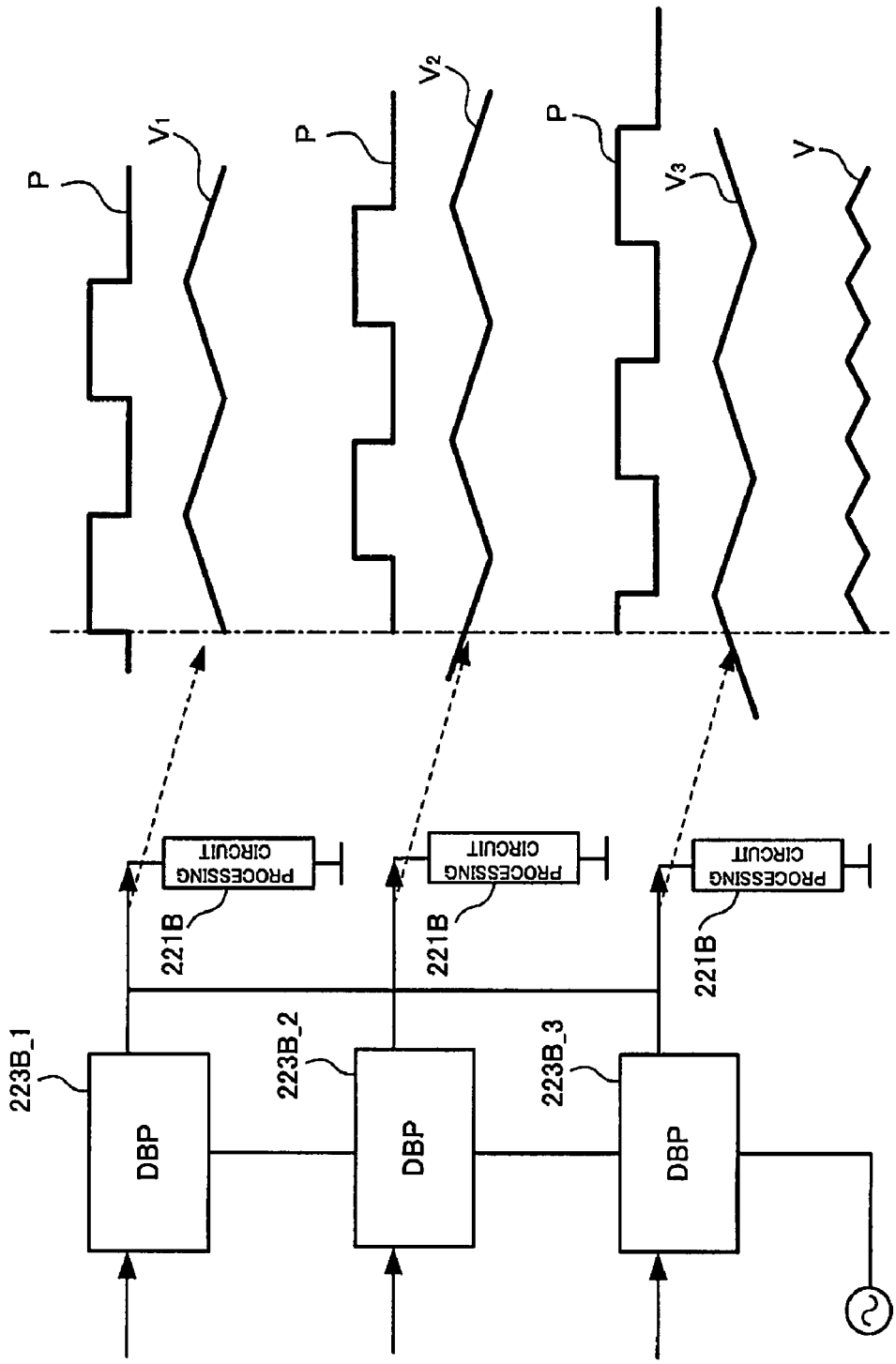
FIG. 9 is a conceptual view illustrating power supplied from each of the three power supply sources to the processing circuit.

FIG. 9 is a conceptual view illustrating power supplied from each of the three power supply sources 223B to the processing circuit 221B.

In the power control circuit 314, when a voltage to be applied to the processing circuit 221B is determined, voltages applied by each of the three power supply sources 223B_1, 223B_2 and 223B_3 to the processing circuit 221B are separately regulated.

FIG. 9 illustrates: pulse signal P generated by the pulse oscillator 315; power V1, V2 and V3 supplied from each of the power supply sources 223B_1, 223B_2 and 223B_3 to the processing circuit 221B; and combined power V of power V1, V2 and V3.

The power control circuit 314 causes the power supply sources 223B_1, 223B_2 and 223B_3 to supply power V1, V2 and V3, respectively, in a phase shifted manner. As a result, combined power V of a higher frequency is supplied to the processing circuit 221B and thus a ripple can be lowered.

In this way, plural power supply sources are connected to one processing circuit, and power is supplied from the plural power supply sources in a phase shifted manner, so the switching frequency of power can be easily raised.

The method of regulating power supply to the four processing circuits 221B, 221C, 221D and 221E in which the load of processing depends on the amount of communication data, has been described above. There will now be described the method of regulating power supply to the processing circuit 221A in which the load of processing varies according more to whether or not the communication data has an accompanying file attached thereto, than to the amount of communication data.

In this processing circuit 221A, as with the other four processing circuits 221B, 221C, 221D and 221E, the power to be supplied at a time after the present time is basically regulated based on the power supplied at a time before the present time (feedback control) and further, a load of processing to be executed at a time after the present time is predicted based on a power control value at a time before the present time, so that power is regulated (feedforward control).

Figure 10:
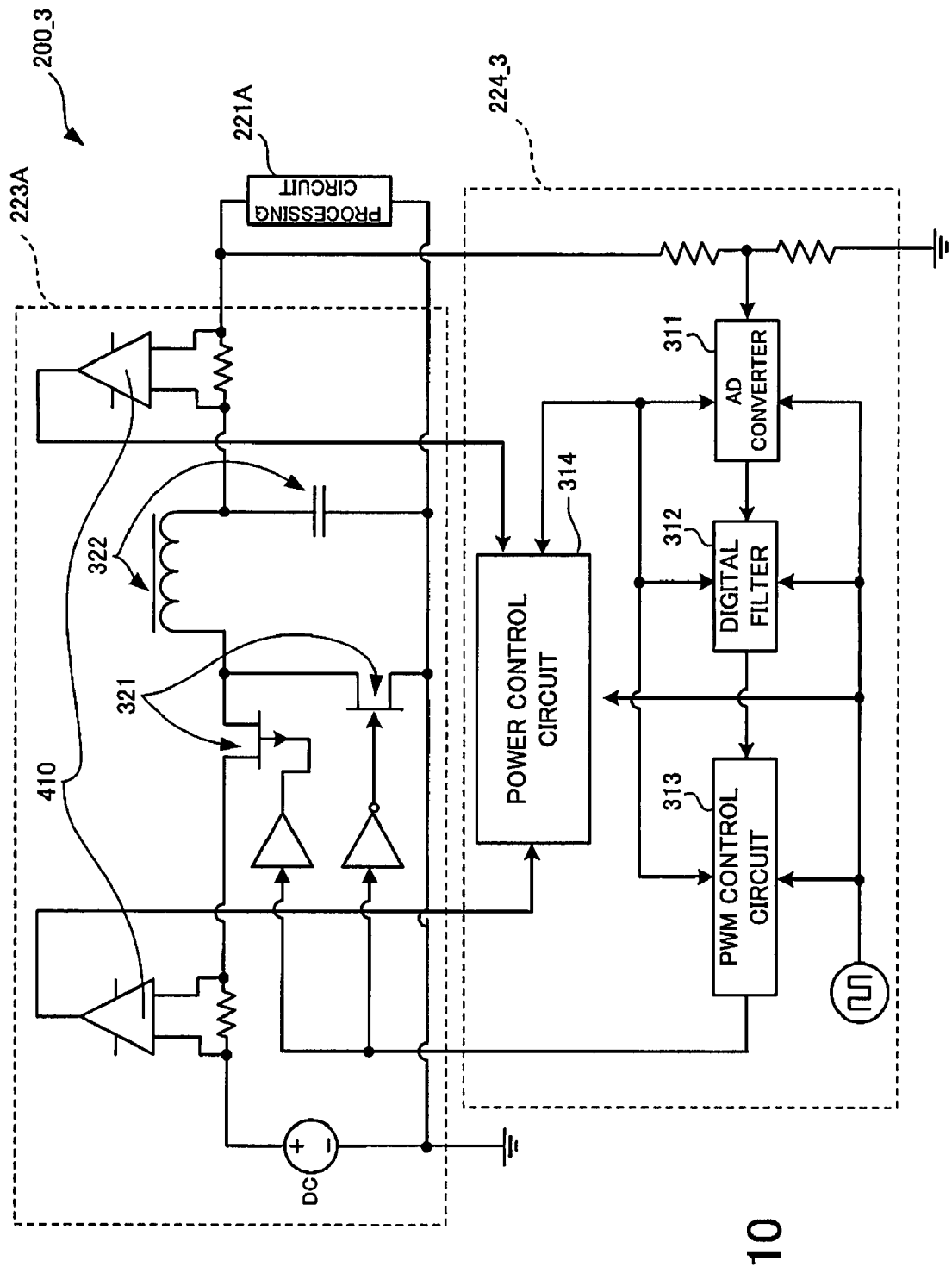
FIG. 10 is a schematic configuration diagram of a power supply source, a power control section, and a processing circuit in a signal processing package according to a third embodiment.

FIG. 10 is a schematic configuration diagram of the power supply source 223A, power control section 224_3, and processing circuit 221A.

In the processing circuit 221A illustrated in FIG. 10, differently from the processing circuit 221B illustrated in FIG. 7, no current value is sent from the former-stage electrical interface package 200_2 to the power control section 224_3; instead, there is arranged a current value detection circuit 410 that detects a current value flowing into the processing circuit 221A.

In regulating the power supplied to the processing circuit 221A, firstly the current value detection circuit 410 detects a current currently flowing into the processing circuit 221A and sends the detected current value to the power control circuit 314.

The power control circuit 314 predicts a current value flowing into the processing circuit 221A at a time after the present time based on a current value flowing into the processing circuit 221A at a time before the present time, so that a voltage value to be applied to the processing circuit 221A is determined according to the predicted current value. Practically, it is analyzed whether the change in current pattern is gradual or rapid. When the change in current flowing in the processing circuit 221A is rapid, it is predicted that the amount of data currently processed by the processing circuit 221A is large and thus the load of processing execution is large. In this case, voltage drop may continue to occur in the processing circuit 221A, so it is determined that a large voltage is to be applied to the processing circuit 221A.

As an approach of predicting current flowing at a time after the present time based on current currently flowing, there can be used a regression analysis method or the like of predicting a subsequent numerical value by a correlative relationship between plural numerical values. The regression analysis method is a numerical value estimation method which has hitherto been widely used, and hence a detail explanation thereof is omitted in the present specification.

The power control circuit 314 controls based on the determined control voltage value, the AD converter 311, digital filter 312 and PWM control circuit 313. As a result, the determined control voltage value is applied to the processing circuit 221, and power is supplied according to the load of processing.

When the load of processing at a time after the present time cannot be predicted based on the load of the former-stage processing, if the estimation is made based on the load of processing by the own processing circuit, the voltage applied to the processing circuit can be accurately regulated.

There has been described above an example in which a current value flowing into the processing circuit during processing execution is detected as the load of processing execution, but the load detection section according to the present invention may detect an amount of processing data as the load of processing execution.

Also, there has been described above an example in which the power supplied to the processing circuit is regulated by raising or lowering the voltage applied to the processing circuit, but the power control section according to the present invention may control the power supplied to the processing circuit by regulating the current value supplied to the processing circuit.

Also, there has been described above an example in which, when operational abnormality occurs in the power control section, the same power as one at a time before the time when the operational abnormality is detected is supplied to the processing circuit, but the supply section according to the present invention may supply a predetermined power to the processing circuit when operational abnormality occurs in the power control section.

What is claimed is:

1. A power supply device comprising:
a supply section that supplies power to a second processing device which sequentially processes communication data transmitted from a first processing device in response to processing execution by the first processing device which has a processing circuit to process communication data;
a load detection section that detects a load of processing execution by the first processing device; and
a power control section that causes the supply section to increase or decrease power supply according to the magnitude of load detected by the load detection section.

2. The power supply device according to claim 1, wherein:
in the supply section, voltage is variable in supplying power; and
the power control section causes the supply section to increase or decrease power supply by raising or lowering the voltage of the supply section.

3. The power supply device according to claim 1, wherein the first processing device and the second processing device are incorporated in a communication apparatus and serve to apply a communication processing to data communicated by the communication apparatus.

4. A communication apparatus comprising:
a first processing section that serves to apply a first communication processing to communication data;
a second processing section that serves to apply a second communication processing to communication data transmitted from the first processing section in response to processing execution by the first processing section;
a supply section that supplies power to the second processing section;
a load detection section that detects a load of processing execution by the first processing section; and
a power control section that causes the supply section to increase or decrease power supply according to the magnitude of load detected by the load detection section.

5. The communication apparatus according to claim 4, wherein:
in the supply section, voltage is variable in supplying power; and the power control section causes the supply section to increase or decrease power supply by raising or lowering the voltage of the supply section.

* * * * *